(12) United States Patent
Maffia

(10) Patent No.: US 6,660,829 B1
(45) Date of Patent: Dec. 9, 2003

(54) COLLAGEN-BASED DISPERSIONS AND MACROPOROUS STRUCTURES

(76) Inventor: Gennaro J. Maffia, 4018 Foxhill La., Newtown Square, PA (US) 19073

( * ) Notice: Subject to any disclaimer, the term of this patent is extended or adjusted under 35 U.S.C. 154(b) by 308 days.

(21) Appl. No.: 09/822,282

(22) Filed: Mar. 30, 2001

Related U.S. Application Data

(60) Provisional application No. 60/193,838, filed on Mar. 31, 2000.

(51) Int. Cl.[7] .............................................. A61K 38/12
(52) U.S. Cl. ....................................................... 530/35
(58) Field of Search ................................. 530/356, 350; 623/11, 15; 260/123.7; 106/161; 351/160

(56) References Cited

U.S. PATENT DOCUMENTS

| | | | |
|---|---|---|---|
| 4,079,003 A | | 3/1978 | Manchak |
| 4,148,664 A | * | 4/1979 | Cruz, Jr. ........................ 602/50 |
| 4,268,131 A | * | 5/1981 | Miyata et al. ........... 351/160 H |
| 4,582,640 A | * | 4/1986 | Smestad et al. .............. 530/356 |
| 4,642,117 A | * | 2/1987 | Nguyen et al. ........... 623/23.72 |
| 4,861,714 A | | 8/1989 | Dean, Jr. et al. |
| 4,863,856 A | | 9/1989 | Dean, Jr. et al. |
| 4,997,753 A | | 3/1991 | Dean, Jr. et al. |
| 5,100,783 A | | 3/1992 | Dean, Jr. et al. |
| 5,629,191 A | | 5/1997 | Cahn |
| 5,714,582 A | * | 2/1998 | Wolfinbarger ................ 530/356 |

FOREIGN PATENT DOCUMENTS

| | | |
|---|---|---|
| GB | 1347582 | 2/1974 |
| GB | 1450686 | 9/1976 |
| GB | 1571561 | 7/1980 |
| JP | 03128983 | 5/1991 |

* cited by examiner

*Primary Examiner*—Karen Cochrane Carlson
*Assistant Examiner*—Sheridan Snedden
(74) *Attorney, Agent, or Firm*—Evelyn H. McConathy; Dilworth Paxson LLP

(57) ABSTRACT

The present invention pertains to the production of collagen-based products in the form of dispersions and macroporous structures using untreated raw fibrillar type I corium as the starting material. The resulting dispersions have improved characteristics making them ideal for use in environmental applications as a settling aid, a filtration aid, a fractionation medium, an oil droplet stabilizer, a water purification aid, and a water siphoning aid. The dispersions may be further treated in accordance with the methods described herein to form macroporous structures suitable for biotechnological applications including use as a cell culturing substrate and non-biotechnological applications including use as an organic aerogel.

11 Claims, 3 Drawing Sheets

Figure 1
Collagen Applications

- Environmental
  - solids settling
  - solids agglomeration
  - filtration
  - oil stabilization
  - extraction
  - fractionation
  - concentration of dissolved salts/metals
  - smart gel

- Biotechnology/Medical
  - cell culture
  - controlled release
  - cell host
  - bioreactors
  - encapsulation
  - biosensors
  - organ regrowth
  - tissue repair/regrowth

Figure 2
Preparation of Collagen Dispersions

- Major Process Steps
  - incoming QC - physical tests
  - ball milling in dilute solution of DI water
  - strain, centrifuge (low temperature)
  - decant, repeat centrifuge step several times
  - QC testing on recovered fibers
  - formulation and blending
  - addition of desired inert and/or active ingredients
  - dispersion reaction (up to 2 months)

Figure 3
Preparation of Dried Collagen Matrix

- Major Process Steps
  - QC testing on collagen dispersions
    - (swelling ratio, viscosity, etc.)
  - cast into desired geometric shape, then freeze
  - heat to reaction temperature
  - thermal soak
  - refreeze, lyophilize
  - crosslink
  - sterilize
  - package and ship

COLLAGEN-BASED DISPERSIONS AND MACROPOROUS STRUCTURES

CROSS REFERENCE TO RELATED APPLICATION

This application claims the benefit of U.S. Provisional Patent Application No. 60/193,838 filed on Mar. 31, 2000.

FIELD OF THE INVENTION

The subject invention relates in general to the preparation of novel collagen-based products, and in particular to methods of preparing improved collagen-based dispersions and macroporous structures for both existing and new applications in the environmental and biotechnological fields.

BACKGROUND OF THE INVENTION

Collagen is a biodegradable polymeric fibrous protein found in all animals. In a series of steps, the collagen molecule assembles into a fiber that has the appearance of a rope. The material is insoluble in water, but can retain many times its own mass in water near its charged surface. This and the ability to unravel the fiber thus maximizing the surface area is the key physical property that leads to numerous environmental and biotechnological applications.

With regard to environmental applications, when added to sludge or any material with suspended solids, a collagen dispersion causes agglomeration, the formation of large flocs, and settling, both at a very rapid rate. The material has proven to be effective in the rapid agglomeration of fine solids in all types of sludge: industrial, water treatment, waste water, inert suspensions, and kaolin.

Applicant has discovered that collagen dispersions may also be used in other environmental applications such as, as an aid to filtration, separation of pollutants (including metals and soluble organic molecules) from aqueous streams, selective fractionation of molecules, and oil droplet stabilization. Moreover, because treated collagen can hold hundreds of times its mass in water, Applicant has discovered its use in water purification (with minimal energy consumption) and in water siphoning. All of these applications are based on the affinity of the activated surface of collagen, carrying positive charges, for the negative end of the polar water molecule.

Further processing of the dispersions yields products suitable for biotechnological applications. When the collagen dispersion is frozen and then freeze dried, the resulting material retains the overall dimensions of the original frozen material. However, over 99% of the volume is empty and the structure of the protein is a spongy organic aerogel with controllable pore size, good mechanical properties and a density of one thousandth of water. This solid material can be crosslinked to anchor or memorize its shape, pore size and morphology.

Covalent bonds, between adjacent collagen molecules, are formed during crosslinking; thus the resulting material will no longer disperse or retain water. When placed in water, the crosslinked collagen sinks because the specific gravity is slightly higher than that of water. During the process of crosslinking, the material that is produced is also sterile. This material has enormous potential in biotechnology especially in the area of cell culture. Some of the cell culture applications include substrates for: a) achieving high cell density in bioreactors leading to increased productivity and reduced reactor sizes; b) hosting unusual and hard-to-culture cells that are used for a variety of applications including biosensors; c) organ and tissue technology that have medical implications (examples are organ regrowth, skin replacement, coating of prostheses and implants, etc.); d) coating of cell culture devices such as roller bottles or glass beads; e) collagen membranes for cell culture and biomolecule delivery; and f) controlled release of pharmaceuticals. In non-biotechnology applications the freeze dried, crosslinked collagen matrix can serve as an organic aerogel. Other possible uses for this material include encapsulation of a wide variety of organisms, enzymes and synthetic material.

SUMMARY OF THE INVENTION

Applicant has discovered that the above described existing collagen-based applications are enhanced, and novel applications possible, using raw fibrillar type I bovine corium as the starting material. Corium is the dermis layer of the hide and is rich in collagen-based connective tissue. While corium has been indicated as a preferred source of collagen for at least some applications, Applicant has discovered that use of a heterogeneous solution of corium as the starting material, as opposed to purified collagen derived from corium, produces superior end-products including new applications and results not heretofore observed.

Previously, corium was pre-treated to remove fats, triglycerides, and other soluble compounds. The resulting raw collagen was then conventionally dried and milled in a knife mill. In the present invention, a dilute solution of the corium itself is milled in a ball mill containing zirconia media for one to two weeks. The pretreatment steps are avoided. Once milling is completed, the resulting material is strained, washed, and then subjected to low temperature centrifugation and the supernatant decanted. This process is repeated several times until no fats or other soluble materials appear in the upper phase and the supernatant is clear. The lower phase containing collagen is then blended in a solution containing an organic acid to form a dispersion and allowed to thicken. The resulting dispersion has improved physical properties and results in enhanced performance when used in various environmental applications. The above dispersion may be further processed to form physically improved collagen macroporous structures or substrates capable of utilization in various biotechnological applications. During the blending stage any material for encapsulation or controlled release is added.

There has thus been outlined, rather broadly, some important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide collagen-based products having improved physical properties.

It is another primary object of the subject invention to provide a process for making collagen-based products having improved physical properties.

It is another primary object of the subject invention to provide improved collagen dispersions capable of superior performance in environmental applications.

It is another object of the subject invention to provide improved collagen macroporous structures capable of superior performance in biotechnological applications.

Another important object of the subject invention is to provide an improved collagen dispersion capable of serving as a superior flocculant for enhanced solid settling.

It is also an object of the present invention to provide an improved collagen dispersion capable of serving as a superior filtration aid.

It is another object of the present invention to provide an improved collagen dispersion capable of serving as a superior extraction agent for phase transfer of various materials including soluble organic contaminants and dissolved metals.

Still another object of the present invention is to provide an improved collagen dispersion capable of serving as a superior oil stabilization agent.

Yet another object of the present invention is to provide an improved collagen matrix for cell culturing in bioreactors and for artificial organs and skin.

It is also an object of the present invention to provide an improved collagen-based aerogel for cell culturing, insulation and as a targeting material for chemical lasers.

Another object of the present invention is to provide a method for controlling the pore size and morphology of collagen-based substrates and matrices.

Another object of the present invention is to provide a method for encapsulating materials that would be used for controlled release of pharmaceuticals.

Another object of the present invention is to provide an enhanced collagen dispersion with physical properties of a "smart" gel.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 illustrates existing and novel collagen applications;

FIG. 2 depicts the major process steps in preparing a collagen dispersion from the corium starting material; and FIG. 3 depicts the major process steps in preparing collagen substrates from the dispersion material of FIG. 2.

TABLE OF APPENDICES

The contents of the following appendices are incorporated herein by reference.

APPENDIX A is a compilation of data and additional disclosure material relating to the improved physical properties of collagen dispersions created using corium as the starting material;

APPENDIX B is a compilation of data and additional disclosure material relating to the improved physical properties of collagen macroporous structures, including aerogels, created using corium as the starting material;

APPENDIX C is a compilation of data and additional disclosure material relating to collagen dispersions used in the application of flocculation and settling of solids;

APPENDIX D is a compilation of data and additional disclosure material relating to collagen dispersions used in the application of filtration;

APPENDIX E is a compilation of data and additional disclosure material relating to collagen dispersions used in the application of extraction of dissolved organics and metal salts.

APPENDIX F is a compilation of data and additional disclosure material relating to collagen macroporous structures used in the application of cell growth for bioreactors, biosensors and other biotechnology areas.

DETAILED DESCRIPTION OF THE INVENTION

Reference is now made to FIG. 1 which serves as a road map to the numerous environmental and biotechnological applications which are possible with the subject invention. More specifically, when raw corium is used as the starting material and processed in accordance with the method set forth in FIG. 2 (described below), the resulting dispersion may be used in several environmental applications including flocculation and settling of solids, filtration, fractionation and extraction, and oil stabilization. Further processing of the dispersion in accordance with the method set forth in FIG. 3 (also described below) yields collagen-based macroporous structures of controllable morphology. These structures have utility in biotechnological applications including cell culture and all growth, production of artificial organs and skin, and as organic aerogels.

Corium is the dermis layer of the hide and is rich in collagen-based connective tissue. While corium has been indicated as a preferred source of collagen for at least some applications, Applicant has discovered that use of a heterogeneous solution of corium as the starting material, as opposed to pure collagen derived from corium, produces physically distinct dispersions and macroporous structures heretofore unobserved. Moreover, Applicant has discovered that the above described existing collagen-based applications are enhanced, and novel collagen-based applications are possible, with these products derived from raw corium. While there theoretically exists many types of collagen, fibrillar type I bovine collagen is preferred. Typical sources of type I collagen include: bovine, porcine, chicken and fish skin, bovine and chicken tendon and bovine and chicken bones.

METHOD OF PREPARING COLLAGEN DISPERSIONS

Previously, corium was pre-treated to remove fats, triglycerides, and other soluble compounds. The resulting raw collagen was then conventionally dried and milled in a knife mill. Referring now to FIG. 2, in the present invention, a dilute solution of the corium itself (i.e., approximately 10 g/500 ml) is milled in a small ball mill containing ⅜" zirconia media stones for one to two weeks. The pretreatment steps are avoided. Failure to mill for the proper duration will result in a poor end-product. Under-milling yields a clumpy material that becomes non-homogeneous when subsequently blended. Over-milling of the corium produces collagen with reduced surface activity. Temperature and ionic strength must be controlled during the milling process.

Careful observation and experimentation have revealed that, for many of the applications described herein, the key to obtaining enhanced performance is the ability to unravel the collagen without disturbing its fundamental molecular structure. It is hypothesized that the presence of fats and other soluble materials contained in the raw corium facilitate unraveling of the collagen fibers to their maximum potential during milling while protecting against molecular degradation. The fats and other materials present in raw corium may serve as a lubricant which facilitates these ends. To date, Applicant is not completely certain why the use of corium, rather than purified collagen derived from corium or other purified collagen available from chemical distributors, produces superior end-products. Applicant only knows that corium treated in accordance with the methods described herein does produce collagen-based products with superior physical properties as compared with collagen-based products of the prior art.

Once milling is completed, the resulting material is strained, washed and then subjected to centrifugation at approximately 0–5 degrees Centigrade. The supernatant is analyzed and then decanted. This process is repeated several times until the final centrifugation reveals no fats or other material in the upper phase. The lower phase contains collagen in the form of a semi-solid paste. The paste is then blended with a small amount of deionized water to produce a 1–3% collagen stock solution.

The collagen stock solution is then blended in an organic acid such as acetic, citric, or oxalic acid forming a collagen dispersion. The blended formulation is comprised of 0.25–2.0% collagen, 5% acid, and 93–94.75% de-ionized water. The material is blended in a lab mixer for approximately one half of a day. The blended material is permitted to thicken over several hours and will continue to do so for approximately two months. The dispersion is typically refrigerated during the thickening process. During the blending process additives; such as, inert weighting material, pharmaceuticals or other biologically active agents may be added.

The strength of the dispersion may be measured in terms of swelling ratio and viscosity. The swelling ratio is defined as the mass of water retained by the collagen divided by the mass of collagen fibrils in the dispersion after centrifugation. Swelling ratio is a function of pH. Maximum swelling ratios are observed at about a pH of 3 and the dispersion may be caused to collapse as pH is raised toward the isoelectric point (between 7 and 7.5) where the swelling ratio is low. Raw data and/or disclosure pertaining to the improved physical properties of dispersions created in accordance with the above method and using corium as a starting material are contained Appendix A.

As mentioned, the above described dispersions have utility in a variety of environmentally related applications each of which are described in greater detail below.

ENVIRONMENTAL APPLICATIONS

Flocculation and Settling of Solids

The above collagen dispersions have, when added to sludge or any material with suspended solids, demonstrated a remarkable ability to cause rapid agglomeration (formation of large clumps or flocs) of the suspended solids and rapid settling thereof. Prior sludge clean-up efforts have employed the use of synthetic materials or machinery. These materials themselves are persistent in the environment and may cause additional environmental concern. Applicant has discovered that the settling rates are more than ten times greater with collagen than with conventional chemical treatment. This has been noticed for many types of sludge including sludge from industrial plants, water and waste water treatment, and including inert suspensions, kaolin, and biologically active sludges. Moreover, settling rates with dispersions created in accordance with the above described method are superior to those achieved using prior art collagen dispersions. Appendix C is a compilation of data and additional disclosure material relating to collagen dispersions used in the application of flocculation and settling of solids. In particular, this Appendix C contains data on the addition of collagen dispersion directly into a kaolin solution and resulting effects in terms of turbidity and settling times, etc.

Collagen Dispersions as a Filtration Aid

Applicant has also discovered that its collagen dispersions may be successfully employed in another environmental application, namely as an aid to filtration. Appendix D is a compilation of data and additional disclosure material relating to the use of the subject collagen dispersions in filtering systems. As will be readily apparent upon review of said data, the addition of the subject dispersion to the filtration system results in substantial acceleration of the filtration of a sludge material. Comparison of observed filtration or settling rates of sludge material using the subject dispersion material versus conventional polymers reveals that the former is significantly superior.

Collagen Dispersions as a Fractionation and Extraction Aid

Another important environmental application of the subject dispersion is the removal of organic contaminants or dissolved metals from water. Due to the size, shape and charge of the collagen, molecules have been selectively trapped in the collagen leaving clean water behind. The subject dispersions thus act as a fractionation medium for the separation of two or more components (for example, ethanol and water and likely MTBE and water).

When the subject dispersion is diluted in water and centrifuged, two highly distinct homogeneous aqueous phases are formed. The lower phase is cloudy or milky in appearance while the upper aqueous phase is remarkably clear. The boundary between the phases is readily apparent. Applicant has discovered that any molecules present in solution (added to the water or added to the diluted suspension) will distribute themselves between the two phases during centrifugation. Molecules usually display a preference for one of the phases.

For example, a 20% concentration of ethanol in water used to dilute the dispersion is centrifuged. The two phases are formed. When the aqueous phase is poured off and analyzed, it will contain a substantially reduced concentration of ethanol. 50% and greater reductions have been observed. The balance of the organic contaminant is of course trapped in the lower phase. Extraction of the contaminant is made possible by collapsing the dispersion by raising the pH. This "smart" property of collagen dispersions may also suggest other applications. The degree of reduction is dependent on the amount of collagen in the dispersion as well as the starting concentration of the organic contaminant. More specific and detailed information and data relating to extraction of ethanol is contained in Appendix E.

Collagen Dispersions as an Oil Stabilizer

Another environmentally related application of the subject collagen dispersion relates to stabilization of oil in water. When oil is present on top of water it will form a uniform layer. Applicant has discovered that when a small amount of the subject dispersion is added, the oil layer is uniformly converted to fine spheres or droplets approximating 1 mm in diameter. These droplets are highly stable having the ability to resume their shape, size and relative quantity after agitation. The oil will not stretch out across the water again.

METHOD OF PREPARING COLLAGEN MACROPOROUS STRUCTURES

Reference is now made to FIG. 3 wherein a diagram of the method of preparing various collagen macroporous structures from the above described dispersion is illustrated. From the dispersion, a series of steps involving both heat and mass transfer are carried out. These steps may be modified to produce structures of different morphology or geometries such as beads or microspheres, skins and more amorphous structures. The first morphology described below is that of a microsphere. Methods of producing weighted microspheres are described in detail in U.S. Pat. No. 4,863,856 which was co-invented by Applicant and incorporated herein by reference.

The subject dispersion may be formed into a variety of geometries including small droplets. The material is rapidly solidified by freezing at a temperature below about 0° C. and preferably below about −30° C. to form particles of the desired size. Any known technique for producing small particles can be employed in carrying out the present invention. Suitable techniques include, inter alia, pressure or air-shear spraying, emulsification techniques, droplet formation using Raleigh liquid jet instability techniques, extrusion techniques, droplet formation using gravity or centrifugal forces, electrostatic droplet formation, and droplet formation using inertial forces. For example, suitably sized particles have been prepared using inertial forces to form small droplets at the orifice of a vibrating needle or shaken pippette. The droplets can be frozen by allowing them to fall into a cryogenic bath of liquid nitrogen. Obviously other chilling baths for freezing the droplets could be used, e.g., chilled ethanol. Also, larger sized particles formed by freezing possibly could be reduced to the desired particle size by such destructive techniques as grinding and the like. Those skilled in the art will recognize other techniques suitable for forming small particles of the types described above and the present invention is not intended to be limited to any specific technique. Geometries other than beads may be created by direct immersion as above or by placing the material in a cold freezer.

The pore size and structure of the collagen microsphere is influenced by a variety of factors. For example, collagen dispersion formulation and processing affects pore size and morphology. Differential Scanning Calorimetry studies have provided a map for the proper processing of the dispersion for the desired pore size. The pH of the mixture and the specific acid used in preparing the mixture also affect the pore size and structure of the resultant microsphere. For example, it has been found that too low (or too high) a pH tends to significantly limit the ability to process the collagen dispersion. Data from the DSC has been critical in developing the appropriate processing. Using the DSC data and further experimentation, it has been found that temperature plays a significant role in the production of microsphere porosity. For example, after casting, the frozen collagen droplets are thermally soaked to allow for partial rearrangement of the collagen fibers around a solid water structure. The same is also true when forming other morphologies such as when pouring a quantity of dispersion in a pan, dish or other vessel. The term "rearrangement" means that the milled collagen fibers are sufficiently agglomerated to achieve the desired structural porosity, but are not totally agglomerated. If the rearrangement of the collagen fibers did not occur before the subsequent lyophilization step, structures with small pore dimensions (<5 microns) would result. Typically, this soaking is done at −5° to −30° for 2 to 48 hours. More preferably, the thermal soaking is carried out at −10° C. to −25° C. for 3 to 24 hours. The most preferable conditions for the creation of 40–60 micron pores is −15° C. for 12 hours. These temperatures and times can be modified by one skilled in the art using routine experimentation to attain microspheres of variable porosity. It should be recognized that methods of the prior art were capable of producing microspheres and other collagen macroporous structures having pores that occupied about 70 to about 98% by volume of the structure. Applicant's method of milling raw, untreated corium has made it possible to yield structures having pores that occupy up to about 99.9% by volume of the structure. Such "aerogels" are discussed in greater detail below.

After thermal soaking is performed, the partially frozen composite is refrozen and then is vacuum freeze-dried preferably using conventional equipment operating at a vacuum of more than about less than 100 millitorr and at a condenser temperature of less than −30° C. The combination of freezing and drying is referred to as lyophilization.

Regardless of how the microsphere is dried, the freeze-dried collagen matrix composite then is treated so as to crosslink the collagen. Crosslinking serves to anchor the pore size and morphology of the structure. The collagen can be crosslinked using either chemical crosslinking agents preferably selected from the group consisting of a carbodiiamide or N-hydroxy succinimide-derived active esters (succinimidyl active esters), by severe dehydration at an elevated temperature and high vacuum or by a combination of these treatments. The strength and biostability of the collagen matrix so prepared is influenced by the degree of crosslinking introduced through such treatment. These crosslinking methods provide a collagen matrix that is surprisingly resistant to collagenase and other enzymatic degradation thereby making these materials particularly suitable for culturing organisms (see below). The degree of crosslinking can be controlled in order to provide the control release feature required by some pharmaceuticals.

When using such chemical crosslinking agents, the dry collagen matrix material is immersed in a solution of the crosslinking agent at about room temperature for a period of time of from about 2 to 96 hours. The solution of crosslinking agent may contain from about 0.1 to about 15% (weight per volume) of the crosslinking agent. Alternatively, the crosslinking agent could be added to the original solution or dispersion of the collagen source. To crosslink the collagen matrix using severe dehydration, the microsponge is subjected to full vacuum of about 50 millitorr or less for 2 weeks or more at a temperature in the range of about 110° C.–130° C.

The severe dehydration technique is preferred since whenever chemical treatment is used, the collagen matrix must be washed extensively prior to further use in order to remove any excess crosslinking agent. After thoroughly washing the crosslinked collagen matrix in ultra-pure water, the microspheres may then be sterilized using conventional sterilization techniques. It also has been discovered that the severe dehydration treatment for an extended time at an elevated temperature used to crosslink the collagen may satisfactorily sterilize the microspheres, thus obviating any additional treatment.

While many different variables interact during the production of the subject collagen macroporous structures to influence the size of the pores, pore size is mostly a function of the manner in which the collagen matrix is reformed. It is during thermal soaking of the frozen collagen dispersion that the eventual pore size of the collagen bead is set. While it is possible to perceive of numerous variables which might influence pore size during the production of the beads, it is believed that, for a given composition, the size of the pores is a function of the conditions under which the beads or other shaped substrates are thermally soaked and then freeze-dried.

As mentioned above, when a collagen solution is initially prepared it consists of a homogenous mixture of collagen fibers suspended in a water/acid solution. When this solution is dispersed and frozen as droplets in, for example, liquid nitrogen, this homogenous distribution of fibers is still present and resembles a fine mesh-like structure. If the beads are maintained at very low temperatures such that all of the water is present in a crystalline and/or viscous form and the beads are then lyophilized at very low temperature, the resulting beads have very small pores in the range of 1–5 $\mu$m. It is believed that these small pore sizes result because, in the absence of uncrystallized water within the bead during drying, it is not possible for the collagen fibers to migrate and agglomerate. Obviously, the movement of the smaller collagen fibers to form thicker structures must create larger openings within the interstices resulting in larger pores. Thus, pore size is proportional to the size of the ice particles formed as a result of the migration and agglomeration of the collagen fibers in the uncrystallized mobile water phase which is present during freeze-drying. It follows, then, that the production of collagen beads with larger pores should be done under conditions where uncrystallized water as well as crystallized water is present. It is believed that the uncrystallized water which is present is absorbed to the surface of the collagen fibers and is prevented from crystallizing surface changes which are greater than the forces keeping water in the crystalline form.

At this time it is not entirely clear what forces are acting on the collagen fibers to cause their agglomeration. Experimental data suggest rearrangement of the collagen fibers occurs when crystalline water is present, because the resulting acid concentration of the mobile phase is higher than the original acid concentration thus creating a chemical potential. The following applications are intended to more fully illustrate the utility of the collagen macroporous structures prepared in accordance with the above method, without acting as a limitation on its scope. Appendix B is a compilation of data and additional disclosure material relating to the improved physical properties of collagen macroporous structures, including aerogels (see below), created using corium as the starting material.

BIOTECHNOLOGICAL APPLICATIONS

Collagen Macroporous Structures in Cell Culture Applications

The substrates that are produced are also crosslinked; thus anchoring the pore size and morphology. During the crosslinking process, the collagen substrates are also sterilized. The made-to-order porous, crosslinked, and sterilized substrates are potentially an attractive option for biotech and pharmaceutical companies involved in cell culture for biomolecule production.

Collagen matrices can be used in the efficient growth of genetically engineered cells that produce life saving medicines. Cells populate to a much greater extent when anchored in collagen as opposed to being in suspension or in contact with synthetic material. Some cells will only thrive when immobilized in a porous collagen matrix.

It is currently believed that collagen substrates are the ideal material for the culture of previously hard to grow cells such as stem cells (see below). Additionally, collagen substrates have been used to culture a wide variety of other attachment dependent cells. Since the substrates can be manufactured with a wide variety of geometries (beads, slabs, sponges, etc.), the applications are many and varied.

The key advantage of collagen macroporous structures produced in accordance with the subject invention is the ability to control the pore size, the shape of the pore channels, and the morphology of the host structure, all to match the needs of the cells to be cultured. As mentioned, microspheres having voids of 99.9% have been achieved which serve as excellent hosts. Also, collagen provides a natural surface with which the cells can interact. Once immobilized in the collagen substrate, the cells have been found to reach very high cell concentration, approaching in vivo levels. Appendix F is a compilation of data and additional disclosure material relating to collagen macroporous structures used in the application of cell culturing.

Collagen Macroporous Structures as Hosts for Stem Cells

The subject collagen structures appear to be an ideal material for the growth of stem cells. This has vital implications in the following areas: lifetime extension and quality of life enhancement, organ growth, tissue engineering, and creation of biosensors.

Stem cells are the progenitor cells for much of life. The ability to grow these cells outside the body has enormous implications in many areas. The cells are hard to culture but find collagen matrices as a hospitable environment. For example, neural stem cells need to have a certain pore size within the structure in order to populate the matrix and grow. The subject collagen substrates can be tailor manufactured to the desired pore size, void fraction, mechanical strength and conformation. Those structures having exceptionally large pore size and volume are also proving to be the ideal hosts for stem cells. Such aerogels can be over 99% empty, leaving significant room for cell population. The leafy morphology provides an area for the stem cells to condition. The structures are also robust, retaining their mechanical properties and shape during population by cells.

Tissue and Organ Growth Using Collagen Macroporous Structures

The manufacture of replacement tissues and organs may be possible using the subject collagen macroporous structures. It has been observed that the subject structures promote rapid cell colonization. Applicant believes that the morphology of the subject structures can include templates in the shape of organs for subsequent colonization.

The collagen substrates may greatly expand the potential of cell culture in a number of areas. The high cell colonization rates and concentrations are attractive features of collagen substrate and may make some technologies viable. The production of novel drugs by genetically engineered cells may be optimized by the use of collagen substrates. Some technologies may only be viable at the rapid colonization rates and the high cell densities offered by collagen structures of the subject invention. Additionally, some of these cells have been genetically engineered to produce valuable medicines and biomolecules.

Collagen-Based Aerogels

An aerogel is a material that has volume but minimal mass; void volumes are greater than 99% and thus densities are less than 1/100th of water. Most aerogels manufactured today (for use as thermal or audio insulation) are silica based.

The manufacture of organic aerogels made from collagen has been made possible by the above described method. The crosslinking procedure and collagen content may, however, be modified for strength (structural) purposes.

As an organic aerogel, collagen is a spongy material with a very low density. In air this material is one thousandth of the density of water. Accordingly, the material is an excellent insulting material. True density of the material itself is slightly greater than water, therefore, this material will sink upon emersion. It is further believed to function as a targeting material for chemical lasers.

CONCLUSION

The water retention properties of collagen are extraordinary. This property suggests potential applications in many aqueous systems. However, many of the environmental applications described earlier were essentially discovered serendipitously and there may be many more possible applications including use of collagen dispersions and substrates in: the controlled release of drugs, food processing, gel chromatography, electrophoresis, membrane manufacture, smart gel applications and in consumer products such as water wipes, diapers, and the like.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A method of preparing a collagen-based dispersion, comprising the steps of:
   a) preparing a solution of raw corium, said corium being comprised in part of a plurality of raveled collagen fibers;
   b) milling said solution of raw corium until said plurality of collagen fibers are substantially unraveled;
   c) washing and straining the milled raw corium solution of step b);
   d) centrifuging at 0–5° C. the washed and strained raw corium solution of step c) thereby forming a lower collagen containing phase and an upper aqueous phase;
   e) repeating steps c) and d), if necessary, until no fats or other material are visibly present in said upper aqueous phase; and
   f) admixing said lower collagen containing phase with an acid liquid medium thereby forming a collagen dispersion.

2. The method of preparing the collagen-based dispersion of claim 1, wherein said acid is selected from the group consisting of acetic acid, citric acid and oxalic acid.

3. The method of preparing the collagen-based dispersion of claim 1, wherein said collagen dispersion is comprised of 0.25–2.00% collagen, 5.00% acid and 93.00–94.75% deionized water.

4. The method of preparing the collagen-based dispersion of claim 1, wherein said collagen dispersion is milling for approximately 3–5 hours.

5. The method of preparing the collagen-based dispersion of claim 1, wherein additives selected from the group consisting of inert weighting material, pharmaceuticals and biologically active agents are added during said milling of said 1–3% collagen solution.

6. A method of preparing a collagen-based macroporous structure, said macroporous structure comprising an insoluble crosslinked collagen matrix having an open to the surface pore structure; said pores occupying from about 70 to about 99.9% by volume of said macroporous structure wherein said macroporous structure is prepared by the steps of:
   a) preparing a solution of raw corium, said corium being comprised in part of a plurality of raveled collagen fibers;
   b) milling said solution of raw corium until said plurality of collagen fibers are substantially unraveled;
   c) washing and straining the milled raw corium solution of step b);
   d) centrifuging at 0–5° C. the washed and strained raw corium solution of step c) thereby forming a lower collagen containing phase and an upper aqueous phase;
   e) repeating steps c) and d), if necessary, until no fats or other material are visibly present in said upper aqueous phase;
   f) admixing said lower collagen containing phase with an acid liquid medium thereby forming a collagen dispersion;
   g) rapidly solidifying at least a portion of said collagen dispersion by freezing to form a frozen, solid collagen fiber matrix;
   h) vacuum drying said collagen fiber matrix into a dry porous matrix; and
   i) crosslinking the collagen in said dry porous matrix to produce said collagen-based macroporous structure.

7. The method of preparing the collagen-based dispersion of claim 6, wherein said acid is selected from the group consisting of acetic acid, citric acid and oxalic acid.

8. The method of preparing the collagen-based dispersion of claim 6, wherein said collagen dispersion is comprised of 0.25–2.00% collagen, 5.00% acid and 93.00–94.75% deionized water.

9. The method of preparing the collagen-based dispersion of claim 6, wherein said collagen dispersion is milled for approximately 3–5 hours.

10. The method of preparing the collagen-based dispersion of claim 6, wherein additives selected from the group consisting of inert weighting material, pharmaceuticals and biologically active agents are added during said milling of said 1–3% collagen solution.

11. The method of claim 6, further comprising the step of thermally soaking said solid collagen fiber matrix by holding said matrix at a temperature at which said matrix remains frozen and for a period of time and under conditions sufficient to allow partial agglomeration of said collagen fibers to occur.

* * * * *